(12) United States Patent
Frauenhofer et al.

(10) Patent No.: US 11,784,373 B2
(45) Date of Patent: Oct. 10, 2023

(54) METHOD AND SUPPORT DEVICE FOR SUPPORTING A BATTERY HOUSING WHEN INSERTING A BATTERY MODULE

(71) Applicant: AUDI AG, Ingolstadt (DE)

(72) Inventors: Michael Frauenhofer, Aichach (DE); Marc Gormanns, Erlenbach (DE); Ruben Heid, Bammental (DE); Oliver Schieler, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 115 days.

(21) Appl. No.: 17/468,147

(22) Filed: Sep. 7, 2021

(65) Prior Publication Data

US 2022/0094007 A1    Mar. 24, 2022

(30) Foreign Application Priority Data

Sep. 23, 2020 (DE) .......................... 102020124738.9

(51) Int. Cl.
*H01M 50/244* (2021.01)
*H01M 50/264* (2021.01)
*B60L 50/64* (2019.01)

(52) U.S. Cl.
CPC ....... *H01M 50/244* (2021.01); *H01M 50/264* (2021.01); *B60L 50/64* (2019.02)

(58) Field of Classification Search
CPC ..................................................... B60L 50/64
See application file for complete search history.

(56) References Cited

U.S. PATENT DOCUMENTS 11,121,424 B2 *  9/2021  Schuessler .......... H01M 10/049
2020/0099017 A1*  3/2020  Schuessler ........ H01M 10/6556

FOREIGN PATENT DOCUMENTS

DE    102010051753 A1    5/2012
WO    2008/093184 A1     8/2008

OTHER PUBLICATIONS

German Search Report dated Apr. 13, 2021 in corresponding German Application No. 10 2020 124 738.9; 3 pages; Machine translation attached.

* cited by examiner

*Primary Examiner* — Kwang Han
*Assistant Examiner* — Jordan E Berresford
(74) *Attorney, Agent, or Firm* — Maier & Maier, PLLC

(57) ABSTRACT

A method for supporting a battery housing when a battery module is inserted. A support device includes a support for supporting the battery housing. Here, the support has several mutually movable pin elements for setting down the battery housing. A negative shape corresponding to a shape of a base bottom side of a housing base of the battery housing by the pin elements is set on the basis of a selective displacement of the support along a predetermined translational direction of movement in that each pin element is displaced from a respective starting position to a respective end position when it reaches the base bottom side and locked at the respective end position by a locking unit. After the negative shape has been set, the support is displaced by a defined offset distance opposite to the direction of movement.

20 Claims, 3 Drawing Sheets

METHOD AND SUPPORT DEVICE FOR SUPPORTING A BATTERY HOUSING WHEN INSERTING A BATTERY MODULE

FIELD

The invention relates to a method for supporting a battery housing when inserting a battery module into the battery housing. Such a battery module is pressed in the battery housing by pressing or pressing onto the housing base to reduce a pasty heat-conducting material arranged between the battery module and the housing base to a predetermined thickness or height. The invention also includes a support device on which the battery housing can be placed in order to be able to press one or more battery modules into the battery housing.

BACKGROUND

When manufacturing a battery system, a battery housing can be placed onto a support device to then place one or more battery modules onto a heat-conducting material distributed on the housing base, and to press them into the battery housing by a downward pressure force. Another name for such a heat-conducting material is gap filler. The reason for using the heat-conducting material is that a cooling device can be provided in or under the housing base. The heat-conducting material is pressed into the width by the contact pressure or the pressure force, such that its height or thickness decreases, which is conducive to reducing thermal resistance. The measure of the height or the thickness of such a remaining gap between the battery housing and the battery module is also referred to as the gap filler gap. You are interested in a gap filler gap of less than 2 millimeters. In addition, the height or the thickness should be uniform over the entire module base to achieve uniform heat dissipation.

The small height or thickness of less than 2 millimeters can be of an order of magnitude of the manufacturing tolerances of a battery housing. If such a tolerance-subjected battery housing is placed on a support device, there may be an unevenness on the housing base due to a tolerance-related deviation in the design of the battery housing. If a battery module is then pressed or set into the battery housing, it is more difficult to obtain an evenly thickly distributed thermal material by pressing in the battery module, because a support surface of the battery module and a bottom surface of the housing base do not match in shape. It should also be taken into account here that at least regional deformation of the battery housing can occur in connection with supporting the battery housing by means of the support device, which deformation can additionally reduce the thickness or the height of the gap.

SUMMARY

Against this background, it is the object of the present invention to provide an improved concept for a method for supporting a battery housing when inserting a battery module and a support device for this purpose, by means of which the housing base can be supported particularly evenly, and deformation of the same can be reduced during support.

The object is achieved by the subject matter of the independent claims. Advantageous embodiments of the invention are described by the dependent claims, the following description, and the figures.

The improved concept is based on the knowledge that a housing base of a battery housing can have a support-related deformation when the battery housing is supported for insertion of a battery module. Such a deformation can reduce a height or width of a gap between the housing base and the battery module, as a result of which a heat-conducting material applied into the gap can have an inadequate degree of use. The improved concept counteracts this deformation while maintaining a uniform support function for the battery housing.

According to the improved concept, a method for supporting a battery housing when inserting a battery module is provided. Inserting the battery module can also include arranging and/or setting the battery module. Particularly, the method can also be used to set or arrange a plurality of battery modules at the same time or one after the other, wherein reference is made to a single battery module below for the sake of simplicity. The battery housing and the battery module can preferably be integrated in a battery system of the type described at the beginning or can be provided for its production.

The method assumes that each battery module comprises at least one battery cell and is arranged within the battery housing in such a way that a support surface of the battery module, i.e. the support surface of a module base, and a matching support surface of a base top side of the housing base of the battery housing are coupled to one another in a thermally conductive manner by means of a heat-conducting material provided or positioned between the two support surfacese and by applying a contact force. In other words, the battery module is placed on the heat-conducting material and, by pressing in or compressing, that is, by applying the contact pressure to the battery module from above, the heat-conducting material under the battery module between the contact surface of the housing base and the respective contact surface of the battery module is expanded until the heat-conducting material everywhere has a height or thickness which is less than a maximum value, for example, less than 2 millimeters. The height or the thickness is preferably even greater than 0.1 millimeter, particularly greater than 0.5 millimeter, over the entire support surface to ensure appropriate wettability.

To be pressed in, the housing base must be mounted in an accordingly stable or rigid manner, such that it does not change its shape in some places when the pressing force is applied. At the same time, however, it must be ensured that a real shape of the housing base that deviates from the planned shape of the housing base, as can result from the manufacturing tolerances mentioned, can be compensated for, such that the outcome is a uniform thickness or height of the heat-conducting material between the housing base and the respective battery module. For this purpose, the battery housing is supported on the housing base individually or in an adaptable manner by an adjustable support device.

For this purpose, such a support device for supporting the battery housing is provided on a base bottom side of the housing base opposite the base top side of the housing base. It has a supporting means the shape of which can be adapted to the housing base. For this purpose, this supporting means comprises multiple pin elements that can be moved relative to one another for setting down the battery housing, as well as a locking unit for locking the pin elements. For the sake of clarity, it is already noted here that several such supporting means can be provided for setting down a single housing.

A negative shape that matches a shape of the base bottom side of the housing base of the battery housing is set and mapped by means of the pin elements to support the housing base. The supporting means with its pin elements is displaced along a predetermined direction of movement. The direction of movement of the supporting means can extend linearly and particularly perpendicular to a longitudinal extension of the housing base. This means, for example, that the supporting means can be moved from below towards the housing base by means of an actuator unit. For this purpose, the housing base can be held in a predetermined support position by means of a temporary component fixation (e.g. pneumatic spring clamps) until the battery housing is supported by the support device. When the pin elements reach the housing base and the actuator unit is moved further upwards, each pin element is pressed in to a different depth according to the shape of the housing base. As a result, a negative shape matching the shape of the base bottom side of the housing base is reproduced by means of the pin elements, in that each pin element is displaced from a respective starting position to a respective end position upon contact with the base bottom side and is fixed by means of the fixing element. In this context, the respective starting position specifies that position of the respective pin element before contacting the housing base and the respective end position specifies that position of the respective pin element required for mapping the negative shape.

Thus, the pin elements as a whole result in a contact area for setting down at least regions of the battery housing. The pin elements can be made of a rigid material, for example a plastic or a metal. The pin elements are arranged or supported so that they can move relative to one another. Particularly, the pin elements can be resiliently mounted and can be pressed in selectively or pin-individually with a contact force acting against a restoring force in the direction of the supporting means, i.e. opposite to the direction of movement of the supporting means. If an area protrudes from the bottom of the housing base in the direction of the supporting means or if an area is lowered beyond the surrounding surface of the housing base, the pin elements of the supporting means opposite this area are already pressed in when those pin elements of the supporting means that are arranged outside this area are still spaced apart from the housing base. In this way, a contact surface resulting from the pin elements, onto which the housing base is to be placed, can also be adapted to the shape or a height profile of the housing base. In this case, the direction of movement of the pin elements can extend linearly and particularly perpendicular to a longitudinal extension of the housing base. The pin elements can, for example, be designed as vertically movable tables or stamps or pins or plungers and are in turn combined by the supporting means. The pin elements can, for example, have a cylindrical shape or a conical shape. Particularly, a base area of the pin elements can have a round or angular configuration. Furthermore, a large number (e.g. 40 to 60 pin elements per supporting means) can be arranged on pin elements positioned parallel to one another on the supporting means.

The locking unit is provided to fix each pin element in the respective end position, that is to say, to fasten it. By actuating the locking unit, any further displacement of each pin element can be prevented or at least made more difficult, as a result of which the depicted negative shape of the base bottom side of the housing base can be frozen. Locking can take place, for example, as a function of a control signal from a control circuit of the support device or the supporting means. In order to prevent or minimize the pin elements moving together or pressing together when the battery housing is thermally coupled to the battery module, i.e. when applying the heat-conducting material, when inserting the battery module, or during pressing, the pin elements can be held in a locked state by means of the locking unit. Particularly, the locking unit can be configured pneumatically or mechanically, such that the housing base supported by the pin elements does not yield, but rather remains rigid if a contact force is applied to press the battery module into the battery housing. For example, each pin element can be fixed laterally by means of the locking unit by a clamping force that acts perpendicular to the direction of movement. Additionally or alternatively, locking can also be achieved, for example, by holding or actively adjusting a predetermined force value.

To compensate or reverse overpressure of the housing base by the pin elements at least in some areas when the supporting means is displaced, provision is made to reset the supporting means by a defined offset distance opposite to the direction of movement after the negative shape has been mapped and before the heat-conducting material has been positioned. This is because the housing base can be made of a soft metal, particularly an aluminum material, and can have a thickness of less than 1.5 millimeters, particularly less than 1.0 millimeters, between the top and bottom of the base. Overpressing in specific areas can particularly be a plastic and/or elastic deformation of the housing base in the direction of movement, e.g. local bulging upwards, which reduces a gap provided for the heat-conducting material between the contact surface of the battery module and the matching contact surface on the top of the housing base. By displacing the supporting means and the pin elements arranged thereon opposite to the direction of movement, such a deformation can at least partially be reversed. Furthermore, the plastic deformation of the housing base, which remains unaffected by the displacement of the supporting means, can be compensated in the course of applying and/or pressing on the heat-conducting material, wherein the plastically deformed housing base can be transferred into its original form due to a weight of the heat-conducting material and/or a pressing force opposite to the direction of movement. Particularly, it can be achieved in this way that the upper side of the base on which the heat-conducting material is arranged is held or bent flat or shaped to correspond to the support surface of the respective battery module inside the battery housing as well. The two support surfaces described, between which the heat-conducting material is arranged, can therefore be adjusted to one another by reshaping the top of the housing base. The movement of the supporting means opposite to the direction of movement can be provided in the defined offset distance of less than 0.7 millimeters, in particular between 0.1 and 0.5 millimeters. Such a path range predetermined by the offset distance is also referred to as an "offset" herein.

The invention has the advantage that, by means of the offset distance by which the supporting means is displaced, the deformation of the housing base is at least partially reversed or compensated for if the negative shape is set by the pin elements, wherein a supporting function of the support device is retained. Furthermore, the negative shape set by means of the pin elements of the supporting means is mapped particularly precisely to the base of the housing, since the deformation caused by the pin elements when the negative unit is mapped can be at least partially counteracted. As a result, a predetermined height or thickness of a gap can be provided between the housing base and the battery module, as a result of which a defined degree of wetting of the heat-conducting material to be arranged in the gap can be achieved.

The invention also comprises embodiments which result in additional advantages.

In an advantageous embodiment, when setting the negative shape, each pin element is displaced until a sensor unit detects that a respective tip of each of the pin elements touches a respective contact surface on the base bottom side of the housing base and/or a resistance of the base bottom side of the housing base counteracts the displacement of each pin element, and it is found that the respectively touched contact surface touched and/or the resistance exceeds a threshold value. Thus, each pin element is displaced until the threshold value is exceeded, depending on a current contact situation between each pin element and the housing base. The current contact situation includes the respective contact surface of the housing base touched by the respective tip of each pin element and, alternatively or additionally, the resistance experienced by each pin element. This has the advantage that the deformation of the housing base can be reduced or limited. The threshold value can be, for example, a predetermined maximum contact area and/or a predetermined maximum resistance. In this case, the at least regional contact of a respective tip of each of the pin elements with a respective contact surface on the base bottom side of the housing base can be detected by means of the sensor unit. The respective tip of each of the pin elements indicates that side of the respective pin element which is opposite to the supporting means. As an alternative or in addition, the resistance of the base bottom side of the housing base, which each pin element experiences as soon as it touches the base bottom side of the housing base, can be detected by means of the sensor unit.

In another advantageous embodiment, a deformation profile of the housing base of the battery housing caused by the displacement of the pin elements is detected in a calibration phase by means of a measuring device, and the offset distance for the supporting means is determined as a function of the detected deformation profile. In other words, it is first determined to what extent the displacement of the pin elements causes a deformation of the housing base when the negative shape is reproduced. A deformation profile can be created to specify the deformation over the entire housing base. A respective deformation value can be assigned to a respective position on the housing base. Particularly, those areas of the housing base can be identified which have a particularly large or particularly small deformation. Furthermore, an average deformation of a respective subsection of the housing base can be determined, which subsection overlaps the supporting means and the pin elements arranged thereon in the direction of movement. On the basis of the deformation profile determined in this way, the offset distance is determined by which the supporting means is to be reset in order to counteract the deformation of the housing base. It is advantageous that the offset distance can be determined individually for each point on the housing base on the basis of the deformation profile and possible interactions can be recognized.

The deformation profile is determined in the calibration phase before an operating phase, i.e. before moving the support device and assembling the battery. The calibration phase can be carried out at the beginning of a production series or at predetermined and particularly regular time intervals. As an alternative or in addition, the calibration phase and the operating phase can overlap one another, particularly if the battery housing has a large manufacturing-related tolerance.

According to another advantageous embodiment, at least one geometric parameter value of the housing base is determined relative to the supporting means in order to determine the offset distance. This at least one geometric parameter value describes the geometric relationship of the housing base relative to the support device, in particular to the supporting means. The offset distance can be determined, i.e. defined, on the basis of this relationship. The at least one geometric parameter value can be a radial distance of the supporting means to a center point of the base bottom side of the housing base, a normal distance of the supporting means to an axis running through the center of the base bottom side of the housing base and/or a base thickness between the base bottom side and the base top side of a portion of the housing base overlapping the supporting means in the direction of movement. The center point can be, for example, a surface center of gravity of the base bottom side or a volume center of gravity of the housing base. Starting from this center point, the radial distance to the support surface can form the at least one geometric parameter value. As an alternative or in addition, the center point can also encompass a predetermined point on the base bottom side or the housing base that deviates therefrom. The axis running through this center point and a corresponding perpendicular distance from the supporting means can alternatively or additionally be used to determine the offset distance. Particularly, this axis can be an axis of symmetry of the base bottom side. As an alternative or in addition, the base thickness can specify the at least one geometric parameter. The base thickness specifies a normal distance between the base bottom side and the base top side opposite to it.

The determined offset distance is reduced on the basis of a predetermined maximum offset distance as a function of the at least one geometric parameter value. This means that, starting from the specified maximum offset distance, the determined offset distance is reduced, that is to say decreased, as a function of the at least one geometric parameter value. This has the advantage that the determined offset distance can be adapted to a respective geometric relationship between the housing base and the supporting means. For example, the offset distance determined is equal to the maximum offset distance if the center point of the base bottom side and the supporting means, i.e., a center point of the supporting means, directly overlay one another. The determined offset distance is reduced with a respective deflection of the supporting means relative to the center point. For example, the maximum offset distance can be 0.4 millimeters in the center of the base bottom side and be reduced to 0 millimeters outwards in the direction of an edge of the housing base. The offset distance determined for a position of the supporting means between the center point and this edge can decrease linearly or exponentially or quadratically, for example. Such considerations can also be applied analogously to the normal distance to the axis and/or the base thickness.

In another advantageous embodiment, the offset distance is specified as a function of a local base stiffness of the housing base. The base rigidity of the housing base thus defines the offset distance of the supporting means. Bottom rigidity in the context of the invention particularly means a resistance of the housing base to elastic deformation, which is dependent on elastic material properties and a geometry of the housing base. In this context, the bottom rigidity can also include plastic deformability of the housing base. The base stiffness can be variable over the housing base, such that a specific area or point of the housing base has to be taken into account so that the soil stiffness has to be taken into account locally, i.e. locally limited, when determining the offset distance. In this way, the offset distance can advantageously be adapted to the respective base rigidity conditions of the housing base.

In another advantageous embodiment, the offset distance is set to a predetermined minimum offset distance if a stiffening element arranged on the top side of the base is identified which overlays the supporting means at least in sections in the direction of movement. The stiffening element can, for example, comprise a rib of an insert for the battery module or a side wall of the battery housing arranged on the housing base. Due to the stiffening element, the housing base has increased strength and/or rigidity in this area, such that the deformation due to the selectively displaced pin elements is minimal or completely eliminated. It can thus be expedient to define the predetermined offset distance as the offset distance. Under certain circumstances, this distance can also be zero. This results in the advantage that the displacement of the supporting means opposite to the direction of movement is eliminated or only takes place to a reduced extent due to a different deformation behavior of the housing base.

According to another advantageous embodiment, the support device comprises, in addition to the supporting means, another supporting means which is structurally identical to the supporting means, wherein the offset distance of the supporting means and another offset distance of the other supporting means differ from one another. Particularly, the support device can have several supporting means. It is useful if a respective offset distance is determined for the respective supporting means. As a result, the offset distance of the supporting means and the other offset distance of the other supporting means are different from one another if the two supporting means each contribute differently to the deformation of the housing base. For example, the supporting means can be arranged centrally on the housing base and the other supporting means on a reinforced edge of the base bottom side of the housing base, such that the central deformation of the housing base can be greater than a deformation on the edge. The respective offset distances must be adapted accordingly and differ from one another. This has the advantage that the respective offset distance can be determined and set for each of the supporting means.

Furthermore, according to the improved concept, a support device for a method for supporting a battery housing is provided. The method is preferably an embodiment of the method for supporting a battery housing when inserting a battery module according to the improved concept. The support device comprises a supporting means for supporting a battery housing, wherein the supporting means has multiple mutually movable pin elements for mapping a negative shape corresponding to a shape of a base bottom side of a housing base of the battery housing, and a locking unit for locking the pin elements. To set the negative shape, the pin elements are designed to move from a respective starting position into a respective end position when the base bottom side is reached on the basis of a displacement of the supporting means along a predetermined direction of movement. Furthermore, the locking unit is designed to fasten each pin element at the respective end position. Furthermore, the supporting means is designed to be displaced by a defined offset distance opposite to the direction of movement.

To operate the supporting means, the control device can have a control circuit which can be implemented on the basis of at least one microprocessor and/or at least one microcontroller and/or at least one FPGA (Field Programmable Gate Array). The control circuit can have a data memory which can be coupled to the at least one microprocessor/microcontroller/FPGA and which can hold stored program instructions which, when executed by the control circuit, cause the control circuit to carry out an embodiment of the method according to the improved concept.

In an advantageous embodiment, the supporting means has a toggle lever driven by an electric motor for displacement opposite to the direction of movement. In other words, the electric motor moves the toggle lever in accordance with the specified offset distance opposite to the direction of movement. By means of such a toggle lever, the supporting means can be displaced particularly energy-efficiently and precisely. A movement of the toggle lever by means of a hydraulic cylinder when moving the supporting means is explicitly not provided in this context.

In another advantageous embodiment, the pin elements of the supporting means are arranged within a 2-dimensional grid. This can be rectangular, hexagonal or round, for example. A side length or a diameter of the grid can be between 3 and 10 centimeters, for example. A grid-like arrangement of this type can provide a contact surface for the battery housing that is closed apart from gaps between the pin elements, which advantageously promotes equalization of the forces that act on the housing base.

The invention also comprises combinations of the features of the described embodiments. The invention therefore also includes realizations or implementations which each have a combination of the features of several of the described embodiments, provided that the embodiments have not been described as mutually exclusive.

The battery housing with the battery module inserted therein can be provided for a battery system and provided as a traction battery in an electric vehicle or a hybrid vehicle.

BRIEF DESCRIPTION OF THE FIGURES

Exemplary embodiments of the invention are described below. Wherein.

DETAILED DESCRIPTION

Figure 1:
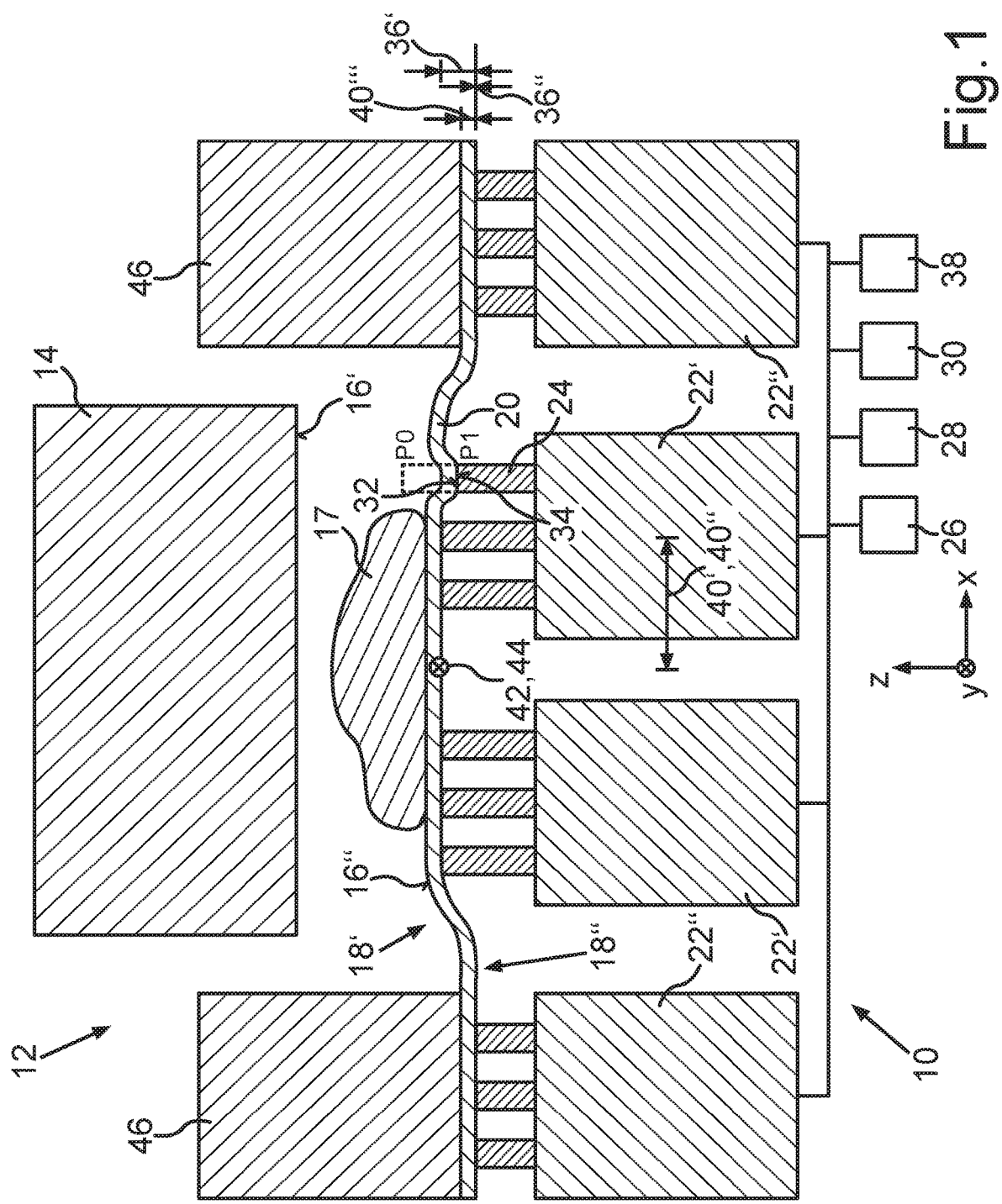
FIG. 1 is a schematic representation of a longitudinal section of an embodiment of a support device according to the improved concept.

The exemplary embodiments explained below are preferred embodiments of the invention. In the exemplary embodiments, the described components of the embodiments each represent individual features of the invention to be considered independently of one another, which each also refine the invention independently of one another. Therefore, the disclosure is also intended to comprise combinations of the features of the embodiments other than those shown. Furthermore, the described embodiments can also be supplemented by further features of the invention that have already been described.

In the figures, the same reference numerals identify elements that have the same function. For the sake of clarity, each of the reference numerals is given only once in the following figures.

FIG. 1 shows an example of a support device 10 in a longitudinal section I-I, by means of which a battery housing 12 can be supported when a battery module 14 is inserted. For this purpose, the battery module 14 can be arranged within the battery housing 12 in such a way that a support surface 16' of the battery module 14 and a corresponding support surface 16" of a base top side 18' of a housing base 20 of the battery housing 12 can be coupled to one another in a thermally conductive manner by applying a pressing force opposite to the z-direction by means of a heat-conductive material 17 positioned between the two support surfaces 16', 16".

The support device 10, which in this case includes two supporting means 22' with three mutually movable and particularly resiliently mounted pin elements 24 as well as two other structurally identical supporting means 22" for placing the battery case 12, is provided to support the battery housing 12 on a base bottom side 18" of the housing base 20 opposite the base top side 18'. Furthermore, the support device 10 comprises a sensor unit 26, a locking unit 28 for each supporting means 22', 22" for locking the pin elements 24, for example as a function of a control signal from the sensor unit 26, and a toggle lever 30 for each supporting means 22', 22", wherein each of the units 26, 28 and the toggle lever 30 are only indicated schematically.

To set a negative shape corresponding to a shape of the base bottom side 18" of the housing base 20 of the battery housing 12 and mapped by means of the pin elements 24, all supporting means 22', 22" and the pin elements 24 arranged thereon are displaced along a predetermined direction of movement, here in the z-direction. When the negative shape is set, each pin element 24 is moved until it is displaced from a respective starting position P0 (exemplified for a pin element 24 by a dashed outline) to a respective end position P1 when it reaches the base bottom side 18". The sensor unit 26 can detect an at least regional touching of a respective contact surface 34 on the base bottom side 18" of the housing base 20' by a respective tip 32 of each of the pin elements 24 and detect that the respective contact surface 34 touched exceeds a threshold value. As an alternative or in addition, a resistance of the base bottom side 18" that counteracts the displacement of each pin element 24 can also be detected and compared to the threshold value. The pin elements 24 are then fastened to the respective end position P1 by means of the locking unit 28 of the respective supporting means 22', 22".

After setting the negative shape and before positioning the heat-conducting material 17, the supporting means 22' are displaced by a defined offset distance 36' and the other supporting means 22' are displaced by another offset distance 36" opposite to the direction of movement, i.e. opposite to the z-direction. The other offset distance 36" of the two other supporting means 22" can be different from the offset distance 36' of the two supporting means 22'.

For the sake of simplicity, reference is made hereinafter to the offset distance 36' of the supporting means 22", wherein an analogous application is also possible for the other offset distances 36". To determine the offset distance 36', a deformation profile of the housing base 20 of the battery housing 12 caused by the displacement of the pin elements 24 can be detected, for example, in a calibration phase by means of a measuring device 38, and the offset distance 36' for the supporting means 22' can be determined as a function of the detected deformation profile. To determine the offset distance 36', several geometric parameter values 40', 40", 40''' of the housing base 20 relative to the supporting means 22' can be determined and the offset distance 36' can be decreased based on a predetermined maximum offset distance as a function of the geometric parameter values 40', 40", 40'''. The geometric parameter values 40', 40", 40''' include a radial distance 40' of the supporting means 22' to a center point 42 of the base bottom side 18", a normal distance 40" of the supporting means 22" to an axis 44 of the base bottom side 18" extending through the center point 42, and a bottom thickness 40''' between the base bottom side 18" and the base top side 18' of a section of the housing base 20 which overlaps the supporting means 22' in the direction of movement, i.e. in the z direction 36' of the supporting means 22' can be specified as a function of a local base stiffness of the housing base 20.

If a stiffening element 46 arranged on the top side 18' of the base is identified which, as shown in FIG. 1, overlays the supporting means 22" at least in sections in the direction of movement, the other offset distance 36" can be set to a predetermined minimum offset distance. This can also apply to the offset distance 36' of the supporting means 22', provided that the stiffening element 46 is arranged centrally on the housing base 20.

Figure 2:
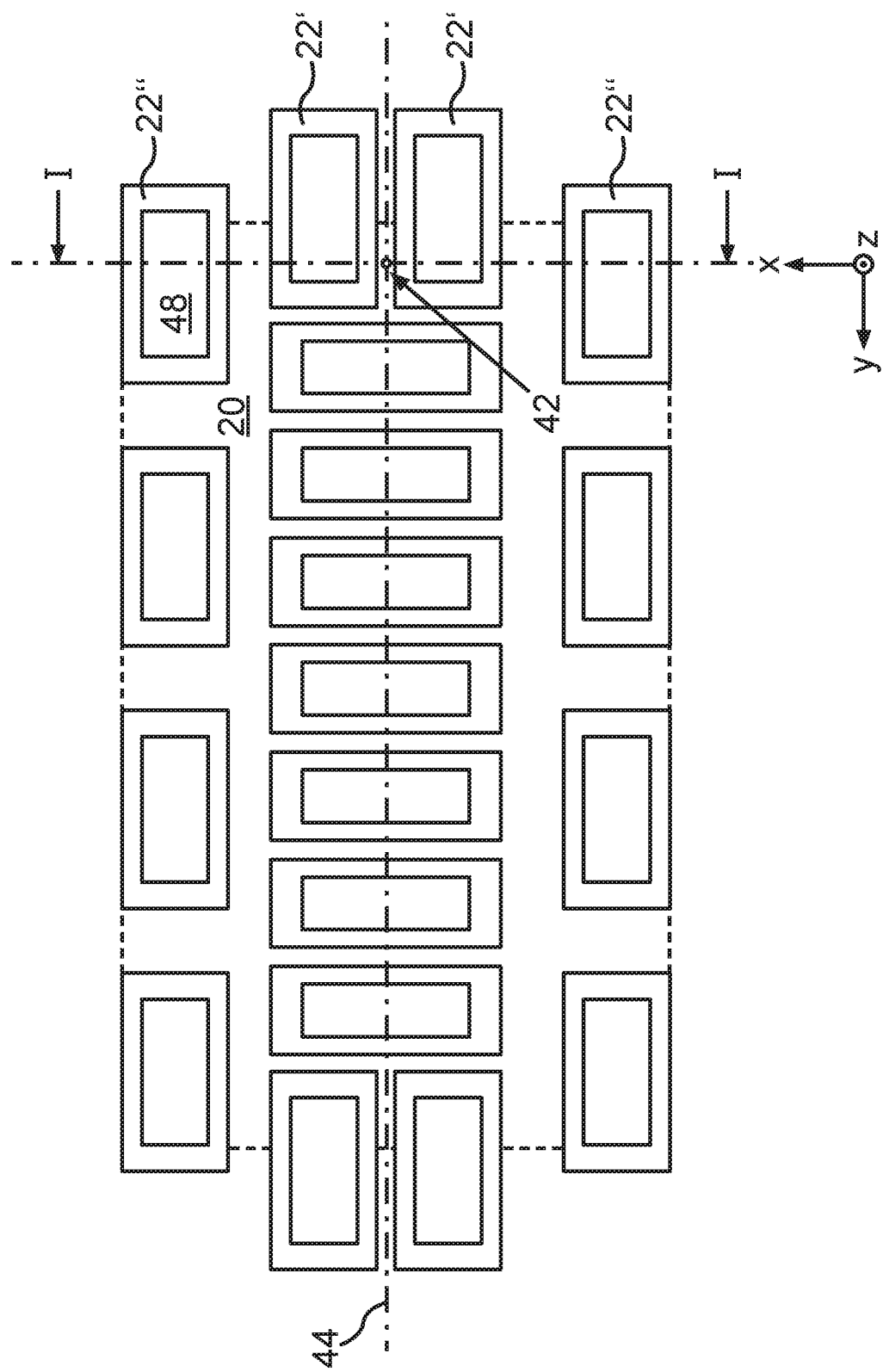
FIG. 2 is a schematic illustration of a top view of the support device of FIG. 1.

FIG. 2 schematically shows a plan view of the support device 10 with reference to the elements described and shown in connection with FIG. 1. The schematically indicated housing base 20 is supported by the nineteen supporting means 22', 22". The respective pin elements 24 of each of the supporting means 22', 22" are each arranged within a 2-dimensional and, in the present case, rectangular grid 48. For the sake of clarity, the individual pin elements 28 are not shown separately in FIG. 2.

Figure 3:
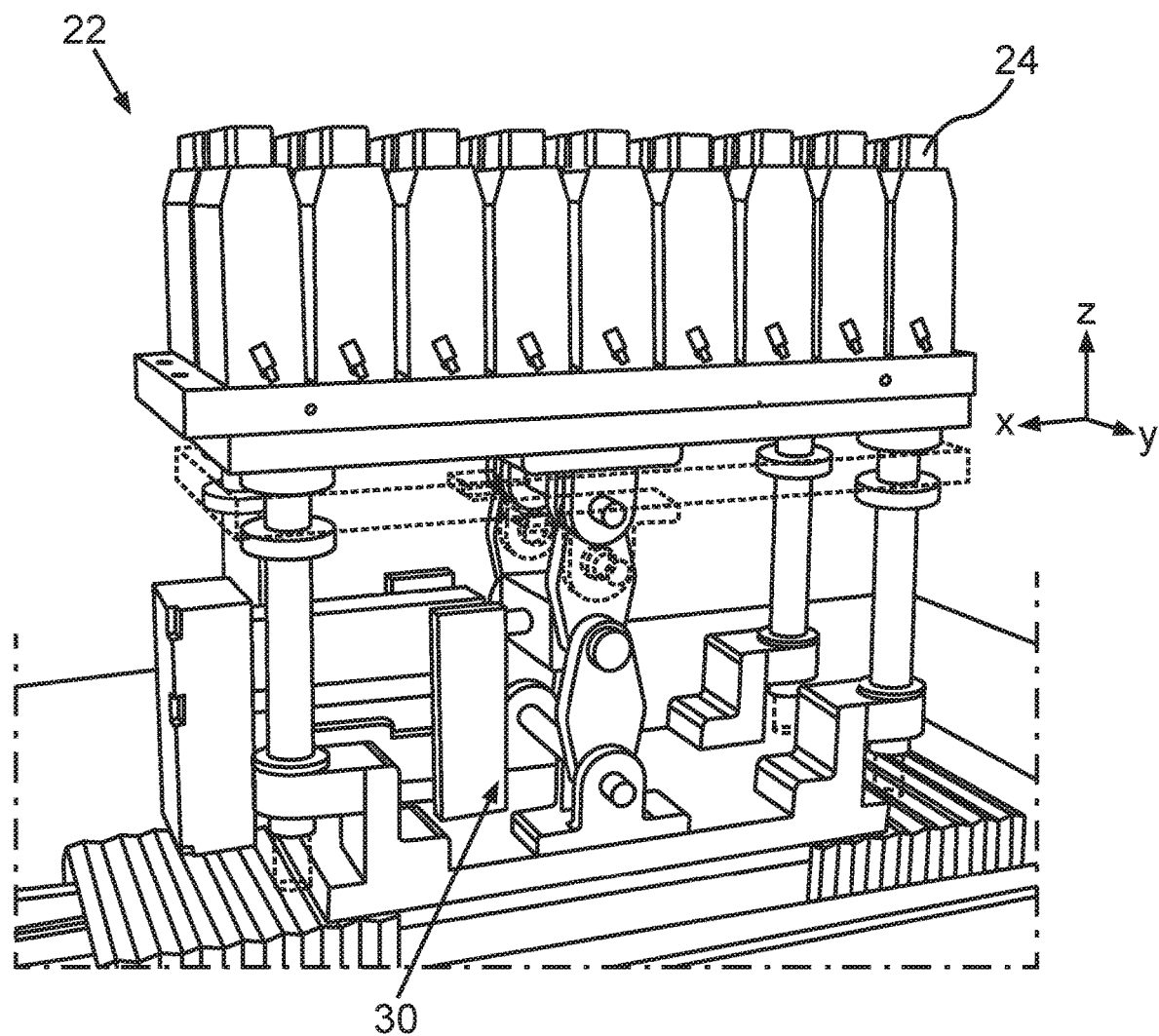
FIG. 3 is a schematic perspective view of an embodiment of a supporting means of the support device.

FIG. 3 shows one of the supporting means 22' with the associated toggle lever 30 with reference to the elements described and shown in connection with FIGS. 1 and 2, wherein, as an example, nine pin elements 24 are respectively arranged in two parallel rows at the supporting means 22'. The pin elements 24 are each resiliently mounted in a frame in the direction of the support unit 22'. If the respective pin element 25 is displaced from the respective starting position P0 into the respective end position P1, the portion of the respective pin element 24 enclosed by the frame is increased. Furthermore, a lever belonging to the locking unit 28 protrudes from the frame, which lever can fix the respective pin element 24 in the respective end position P1 if actuated by the locking unit 28. The pin elements 24 shown are arranged on a carrier plate of the support unit 22', wherein the rectangular carrier plate is initially displaced in the direction of movement, i.e. the z-direction, by means of the central toggle lever 30 and then set back opposite to the direction of movement by the offset distance 36'. To maintain the direction of movement, the support plate of the support unit 22' can have four guide columns which protrude vertically from the support plate on a corner of a side opposite the pin elements 24 and are guided through respective guide openings.

The displacement of the pin elements 24 as well as a subsequent setting back of the supporting means 22', 22" preferably takes place before a thermal coupling of the battery housing 12 and the battery module 14. Alternatively or in addition, individual substeps of coupling, e.g. applying the heat-conductive material 17, replacing the battery module 14, can be performed overlapping in time with the displacement of the pin elements 24 and/or the setting back of the supporting means 22', 22".

For the sake of simplicity, reference is made hereinafter to the supporting means 22". For variable support of the housing base 20 with integrated cooling when a high-voltage battery is manufactured, a flexible counterholder (support device 10) can move up to the housing base 20 from below until it touches the base. In this way, any tolerances of the housing base 20 can be compensated. The counterholder then freezes the housing base 20 in this position and a process of introducing the gap filler (heat-conducting material 17) can be started without the housing base 20 being able to escape downwards. It has been found to be very difficult not to press the housing base 20 upwards when the counterholder approaches. This also takes place with thin pins (pin elements 24) with a very soft resilience. As a result, a height of a gap to be filled with the gap filler can be reduced and thus lead to problems with regard to the degree of wetting in the gap.

For this reason, it can be advantageous if the spring-loaded counterholder moves up to the housing base 20 from below, is fixed on contact, and the supporting means 22' is moved back downwards by a defined distance (offset distance 36') before the gap filler is introduced. Thus, a slight overpressure of the housing base 20 upwards in the z-direction can be leveled out again. Due to the offset value (offset distance 36') in the range of a few tenths of a millimeter, the gap of the gap filler can be enlarged again and the housing base 20 cannot spring away downward after the counterholder has moved away.

That offset distance 36' by which the counterholder with currently installed spring assemblies presses over the housing base 20 upwards is determined by means of a displacement sensor system (measuring device 38). In the process, the supporting means 22' is then moved back downwards by precisely this offset value (offset distance 36') by means of the toggle lever 30, such that the housing base 20 is not overpressed upwards.

The counterholder is generally constructed in such a way that either the entire counterholder or only a part thereof, i.e. a single one of the supporting means 22', can be "offset." Since the overpressing is strongest at the center due to the base stiffness of the housing base 20, only centrally arranged modules (supporting means 22') of the counterholder are set back.

Overall, the examples show how an optimized process management can be provided by an "offset" counterholder (support device 10).

The invention claimed is:

1. A method comprising:
   supporting a battery housing when inserting a battery module, wherein the battery module is arranged within the battery housing;
   coupling a support surface of the battery module and a corresponding support surface of a base top side of a housing base of the battery housing to one another in a thermally conductive manner by applying a pressing force by a heat-conducting material positioned between the support surface of the battery module and the corresponding support surface;
   supporting, with a support device, the battery housing on a base bottom side of the housing base opposite the base top side, wherein the support device comprises multiple pin elements which can move relative to one another and a locking unit configured to lock the multiple pin elements;
   setting a negative shape corresponding to a shape of the base bottom side of the housing base of the battery housing by the multiple pin elements based on a displacement of the support device along a predetermined translational movement direction in that each pin element of the multiple pin elements is displaced from a respective starting position to a respective end position due to ongoing displacement of the support device when the support device reaches the base bottom side;
   locking the support device, after the displacement of the support device has been completed, at the respective end position by the locking unit; and
   after setting the negative shape and before positioning the heat-conducting material and/or the battery module, displacing the support device by a offset distance opposite to a direction of movement.

2. The method according to claim 1, further comprising:
   displacing, when setting the negative shape, the support device until a sensor unit detects that a respective tip of the pin element of the multiple pin elements at least partially touches a respective contact surface on the base bottom side of the housing base;
   detecting a resistance of the base bottom side of the housing base counteracting the displacement of each pin element of the multiple pin elements; and
   recognizing that the respectively touched contact surface and/or the resistance exceeds a threshold value.

3. The method according to claim 2, further comprising:
   determining at least one geometric parameter value of the housing base relative to the support device;
   reducing the offset distance, starting from a predetermined maximum offset distance as a function of the at least one geometric parameter value, wherein the at least one geometric parameter value includes:
   a radial distance of the support device to a center point of the base bottom side of the housing base, and/or
   a normal distance of the support device to an axis of the base bottom side of the housing base which runs through the center point, and/or
   a base thickness between the base bottom side and the base top side of a section of the housing base overlapping the support device in the direction of movement.

4. The method according to claim 2, further comprising:
   determining the offset distance as a function of a local base stiffness of the housing base.

5. The method according to claim 2, further comprising:
   setting the offset distance to a predetermined minimum offset distance after a stiffening element arranged on the base top side is identified, which the support device overlaps at least in sections in the direction of movement.

6. The method according to claim 1, further comprising:
   detecting, with a measuring device in a calibration phase, a deformation profile of the housing base of the battery housing caused by the displacement of the multiple pin elements and,
   depending on the detected deformation profile, the offset distance is determined for the support device.

7. The method according to claim 6, further comprising:
   determining at least one geometric parameter value of the housing base relative to the support device;
   reducing the offset distance starting from a predetermined maximum offset distance as a function of the at least one geometric parameter value, wherein the at least one geometric parameter value includes:
   a radial distance of the support device to a center point of the base bottom side of the housing base, and/or
   a normal distance of the support device to an axis of the base bottom side of the housing base which runs through the center point, and/or
   a base thickness between the base bottom side and the base top side of a section of the housing base overlapping the support device in the direction of movement.

8. The method according to claim 6, further comprising:
determining the offset distance as a function of a local base stiffness of the housing base.

9. The method according to claim 6, further comprising:
setting the offset distance to a predetermined minimum offset distance after a stiffening element arranged on the base top side is identified, which the support device overlaps at least in sections in the direction of movement.

10. The method according to claim 1, further comprising:
determining at least one geometric parameter value of the housing base relative to the support device; and
reducing the offset distance starting from a predetermined maximum offset distance as a function of the at least one geometric parameter value, wherein the at least one geometric parameter value includes:
a radial distance of the support device to a center point of the base bottom side of the housing base, and/or
a normal distance of the support device to an axis of the base bottom side of the housing base which runs through the center point, and/or
a base thickness between the base bottom side and the base top side of a section of the housing base overlapping the support device in the direction of movement.

11. The method according to claim 10, further comprising:
determining the offset distance as a function of a local base stiffness of the housing base.

12. The method according to claim 10, further comprising:
setting the offset distance to a predetermined minimum offset distance after a stiffening element arranged on the base top side is identified, which the support device overlaps at least in sections in the direction of movement.

13. The method according to claim 1, further comprising:
determining the offset distance as a function of a local base stiffness of the housing base.

14. The method according to claim 13, further comprising:
setting the offset distance to a predetermined minimum offset distance after a stiffening element arranged on the base top side is identified, which the support device overlaps at least in sections in the direction of movement.

15. The method according to claim 1, further comprising:
setting the offset distance to a predetermined minimum offset distance after a stiffening element arranged on the base top side is identified, which the support device overlaps at least in sections in the direction of movement.

16. The method according to claim 1, further comprising:
wherein the support device further comprises a supplemental support which is structurally identical to the support device, wherein the offset distance of the support device and an offset distance of the supplemental support differ from one another.

17. The method according to claim 1, further comprising:
detecting, with a measuring device in a calibration phase, a deformation profile of the housing base of the battery housing caused by the displacement of the multiple pin elements; and
depending on the detected deformation profile, determining the offset distance for the support device.

18. A support device comprising:
a support configured to support a battery housing;
multiple pin elements configured to map a negative shape corresponding to a shape of a base bottom side of a housing base of the battery housing and
a locking unit configured to lock the multiple pin elements, wherein the multiple pin elements for setting the negative shape are configured to move due to ongoing displacement of the support along a predetermined translational direction of movement when reaching the base bottom side from a respective starting position to a respective end position and to set the negative shape, wherein the locking unit is further configured to lock each pin element of the multiple pin elements at the respective end position after completion of the displacement of the support, wherein the support is configured to be displaced by a offset distance opposite to a direction of movement.

19. The support device according to claim 18, further comprising:
a toggle lever configured to be driven by an electric motor for displacement opposite to the direction of movement.

20. The support device according to claim 18, wherein the multiple pin elements are arranged within a 2-dimensional grid.

* * * * *